United States Patent
Kudarauskas et al.

(10) Patent No.: US 7,827,901 B2
(45) Date of Patent: Nov. 9, 2010

(54) FREE SWINGING PISTON HEAT MACHINE

(76) Inventors: Sigitas Kudarauskas, Baltijos Pr. 107-38, Klaipeda (LT) LT-93223; Leonas Antanas Kucinskas, Kastonu str. 5-7, Vilnius (LT) LT-01107

( * ) Notice: Subject to any disclaimer, the term of this patent is extended or adjusted under 35 U.S.C. 154(b) by 368 days.

(21) Appl. No.: 11/913,482

(22) PCT Filed: Apr. 24, 2006

(86) PCT No.: PCT/LT2006/000004
§ 371 (c)(1),
(2), (4) Date: Nov. 2, 2007

(87) PCT Pub. No.: WO2006/118437
PCT Pub. Date: Nov. 9, 2006

(65) Prior Publication Data
US 2008/0178847 A1    Jul. 31, 2008

(30) Foreign Application Priority Data
May 3, 2005    (LT) .................................. 2005 046

(51) Int. Cl.
*F01C 9/00* (2006.01)
(52) U.S. Cl. .......................................... 91/339; 92/122
(58) Field of Classification Search ............. 92/67, 92/120, 121, 122; 91/177, 339
See application file for complete search history.

(56) References Cited

U.S. PATENT DOCUMENTS
3,702,746 A * 11/1972 Parmerlee ..................... 92/122

FOREIGN PATENT DOCUMENTS
| DE | 292633 | 4/1914 |
| SU | 1318704 | 6/1987 |
| WO | 95 34750 | 12/1995 |
| WO | 02 101201 | 12/2002 |

* cited by examiner

*Primary Examiner*—Michael Leslie
(74) *Attorney, Agent, or Firm*—Oblon, Spivak, McClelland, Maier & Neustadt, L.L.P.

(57) ABSTRACT

The invention relates to positive-displacement free-piston heat machines with variable working chambers, which could be applied as an internal or external combustion engine, compressor, pump. The machine comprises two analogous assemblies of pistons, each consisting of two or more vanes having form of symmetrical star and attached to the hub. The assemblies of pistons are placed in the cylindrical cavity that is limited by two concentric cylindrical surfaces and two planes at the ends. The vanes the different assemblies are alternately displaced in the cavity. When the assemblies of pistons swing in opposite directions, variable working chambers are got between the adjacent vanes. The external loading or driving devices are connected directly to the assemblies of pistons either by coaxial shafts, radial junctions, planar or cylindrical rings. The machine with two bodies swinging in opposite direction presents well-balanced mechanical system, and vibration of the frame is avoided.

6 Claims, 10 Drawing Sheets

FREE SWINGING PISTON HEAT MACHINE

BACKGROUND OF THE INVENTION

1. Field of the Invention

The swinging piston heat machine belongs to the positive displacement heat machines, whose operation is grounded by variable working volumes, and which are applied as internal combustion engines (spark ignition, diesel), external combustion engines (steam engines, Stirling engines), and as compressors, pumps, and expanders.

2. Description of the Related Art

Free reciprocating piston internal combustion engines are known, whose stroke of piston (or pistons) is not limited by mechanical means and which could vary. These engines are designed to directly drive (with no motion conversion) oscillating electrical generators or other devices with periodical movement (compressors, piledrivers). The free-piston heat machines have some advantages in comparison to the machines with a fixed piston stroke, because variation of the piston stroke enables additionally to control duty of the machine. In the free-piston internal combustion engines it is possible to optimize the combustion process from the viewpoint of efficiency and minimized pollution. The absence of motion conversion, that is, realization of directly driving a secondary device, not only simplifies the structure of the primary device, but also decreases energy losses that are inevitable in any motion conversion.

Single-sided free-piston internal combustion engines having one cylinder are known. "Free-piston engine and method for the conversion of energy stored in fuel into electrical energy in a free-piston engine" (patent DE 04315046 A1, 10 Nov. 1994). A motion conversion is not used in this device, but a spring for reversing the piston is used. The spring complicates the structure of the device and decreases its reliability. In addition, the mechanical system of the engine with one cylinder is unbalanced, which promotes large vibrations of the frame. A similar device of the free-piston engine driving an oscillating electrical generator is also presented as one variant in the patent of French Republic N. 1309350, 8 Oct. 1962 "Dispositif electromagnetique de transformation d'energie".

Doubled free-piston internal combustion engines are known. The pistons move in opposite directions decreasing frame vibration. U.S. Pat. No. 4,154,200 A, 15 May 1979 "Non-polluting heat machine with internal combustion". Motion conversion is absent in this engine, but other imperfections remain, such as the necessity of springs to reverse the pistons of the single-sided engine.

The free-piston internal combustion engine is known, having two double-sided cylinders operating in opposite directions, and driving an oscillating electrical generator. Such engines can be springless. See corresponding variants of the patent of French Republic N. 1309350, 08 Oct. 1962 "Dispositif electromagnetique de transrofmation d'energie". In addition, the doubled variant of such double-sided engines is provided too, in which vibration of the frame is eliminated. Consequently, such free-piston heat machines have the most advantages.

However, in all free-piston engines with linear motion pistons, large friction losses between the piston (or piston rings) and cylinder wall, or in other linear guides are inevitable. Moreover, the four-stroke operation of such engines is well nigh impossible, while the two-stroke operation is imperfect from the viewpoint of the utilization of the fuel and the quality of the combustion process.

The friction of the pistons or their guides can be radically decreased in the swinging (rotating) pistons heat machines.

In the swinging pistons internal combustion engine (patent DE 03303509 A1, 9 Aug. 1984 "Machines with double-acting pistons"), the piston assembly with two vanes of rectangular cross-section, which are symmetrically attached to the cylindrical hub, pivot around the axis of the cylindrical cavity. Four working chambers of the machines are formed between the two fixed vanes and two swinging vanes. The four-stroke and two-stroke operations of the engine are provided. In the later case, a usage of the inlet and exhaust ports in the housing, which are opened by the piston itself, is provided (instead of the valves). Other four-stroke internal combustion engines of analogous structure are also known. (U.S. Pat. No. 5,086,732 A, 11 Feb. 1992 "Four stroke concentric oscillating rotary vane internal combustion engine"). Both these engines have an advantage compared to the engines of linear pistons, that the rotating bearings are used as guides of the swinging pistons without friction from the pistons to the engine cylinder. The friction losses of the rotating bearings are markedly decreased due to the lesser mutual speed of the sliding surfaces. These engines have a compact and workable structure, because the housing cavity and swinging pistons are formed by planar and cylindrical surfaces. However, these engines have imperfections: motion conversion is applied, which converts the oscillation of the pistons into continuous rotation, and which ipso facto are mechanically fixing the pistons stroke; the mechanical system is unbalanced, and promotes vibration of the frame; the concrete strokes of the four-stroke operation of the engine occur in the asymmetrically displaced working chambers, which causes additional loads on the bearings and additional vibration of the device.

Also known are engines with two analogous coaxial assemblies of pistons, in which the piston assemblies are formed by two vanes of rectangular cross-section, which are symmetrically attached to the cylindrical hubs, and the piston's vanes move in the ring shaped cavity of rectangular cross-section forming four working chambers of variable volume (See patents: U.S. Pat. No. 385,856 A, 7 Jan. 1975, "Reciprocating rotary engine"; DE 04014279 A1, 23 Jan. 1992, "Four-stroke, rotary vane IC engine—has vane rotating in one direction only in circular, radial working chamber"; GB 02262569 A, 23 Jun. 1993, "Oscillatory rotating engine"; U.S. Pat. No. 5,537,973 A, 23 Jul. 1996, "Rotary engine with glow ignition system"). In all these devices the above-mentioned advantages of the rotary (or swinging) pistons engines are realized, that is, the small friction in the rotary guides, the compactness of the working chambers, and the workable structure. Consequently, from this standpoint, the mentioned analogues are the most similar to the invention. However, these analogues have imperfections. In all cases, motion conversion is used that employs the unidirectional rotation of the piston assemblies with periodically variable velocities, in this way achieving periodical variation of the working chambers; any external devices (engine's load) are also connected through motion conversion, that is, using the unidirectional rotation of the shaft; the variable velocities of the piston assemblies promote vibrations of the frame; and the four-stroke engine operation is realized in four working chambers, but in any instance the combustion occurs only in one working chamber, and therefore, the high-pressure zone is asymmetrical to the axis, which causes additional vibration and load on the bearings.

SUMMARY OF THE INVENTION

The free swinging piston heat machine has two analogous assemblies of pivoting pistons, each of which are formed by two or more vanes having a form of a symmetrical star, and attached to the hub of assembly. The vanes of both pistons' assemblies are placed in the cross-section ring shaped closed cavity limited by two concentric cylindrical surfaces and two plates at the ends. The machine's housing and corresponding surfaces of the piston assemblies (e.g. the external surfaces of the hubs) form the cavity. The cross-section of vanes corresponds to the cross-section of the cavity, and vanes of the different assemblies are alternately displaced in the cavity.

The piston assemblies could independently pivot around the axis of housing. The rotary guides (bearings) are arranged in the hubs. In this way friction between the vanes and housing is avoided, and total friction losses are markedly reduced, because only the losses in the rotary bearings remain. Moreover, minimal clearance between the movable surfaces could be realized, which could accomplish permissible leakage without additional elements of sealing and lubrication.

When the piston assemblies swing in opposite direction, the variable working chambers between the adjacent vanes are formed. The number of working chambers is equal to the total number of vanes of both piston assemblies (that is, 4, or greater even numbers, of working chambers). If this number is a multiple of 4, the four-stroke operation of the internal combustion engine can be realized. If it is a multiple of 8, the symmetrical four-stroke internal combustion engine must be realized (without additional vibration and load of the bearings).

The external loading or driving devices are connected directly (without motion conversion) to the piston assemblies by coaxial shafts or junctions arranged at the vane ends.

The centers of mass of the piston assemblies, with the connected external moving bodies, must be in the axis of rotation. In this way, the balanced mechanical system of three bodies is achieved, which does not promote vibration of the frame, when the assemblies of pistons swing synchronously in opposite directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views.

Figure 1:
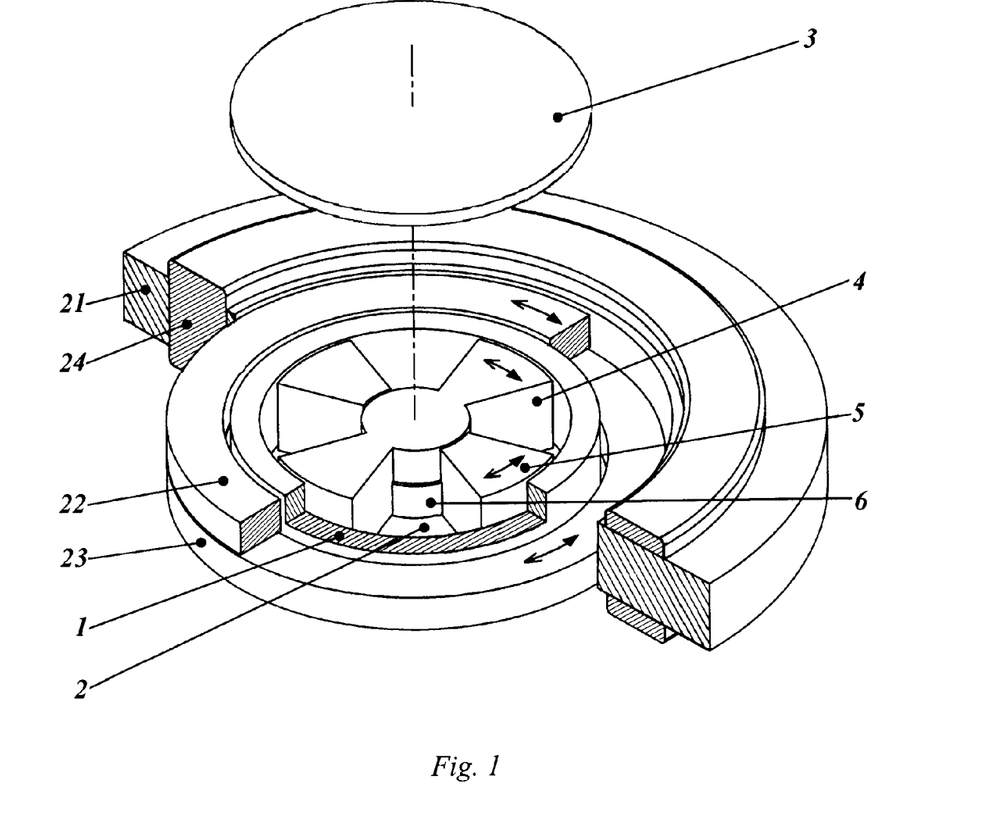
FIG. 1 shows the free swinging pistons heat machine with two vanes in a piston assembly when all working chambers have equal volume, and the oscillating rotary electrical machine with two rotors arranged concentrically around the heat machine.

The free swinging piston heat machine consists of a housing containing a cylindrical cavity. This cavity could be formed by separate parts of the housing, for example, as it is shown in FIG. 1: the cylindrical housing ring 1 and two planar covers 2 and 3 form the cavity (the cover 3 is shown above the device).

Figure 3:
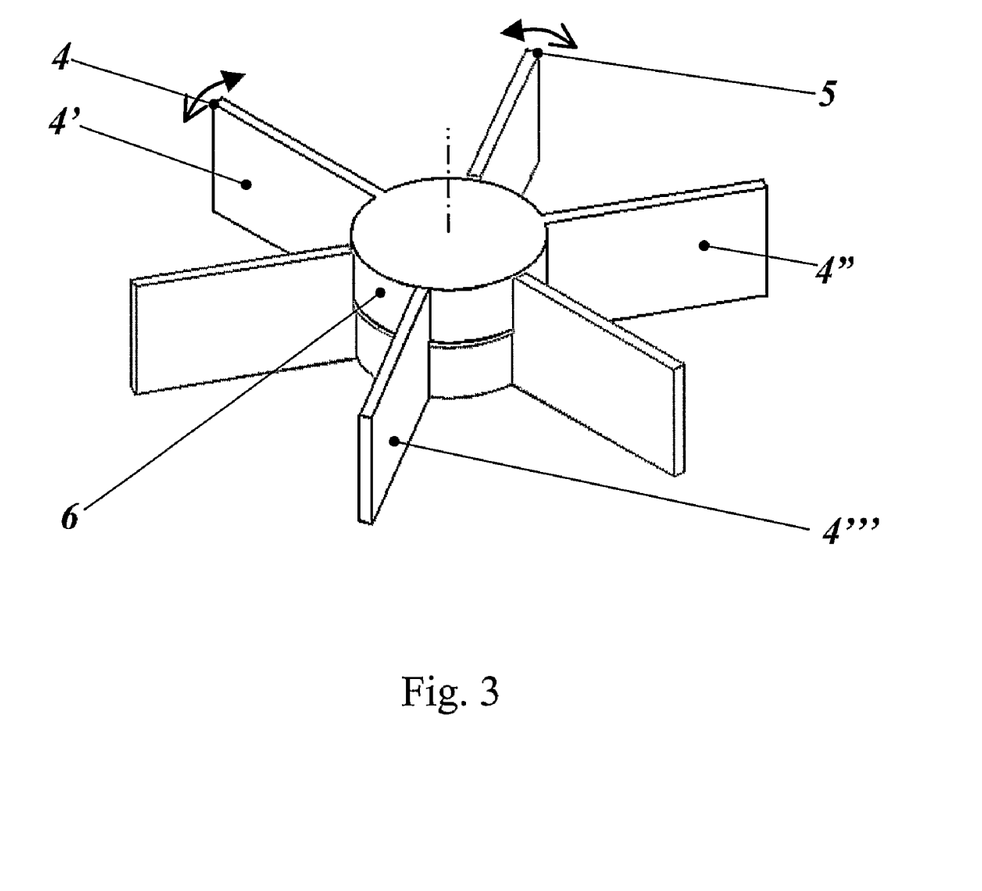
FIG. 3 shows the piston assembly with three vanes.
Figure 4:
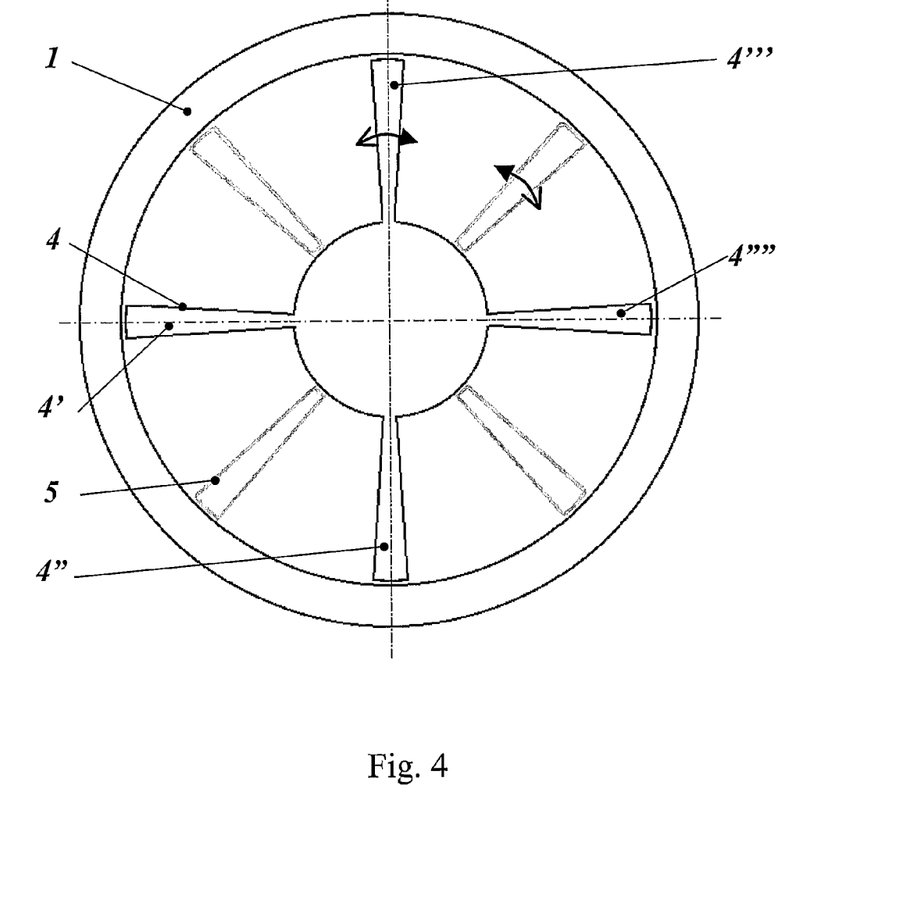
FIG. 4 shows the heat machine, when the piston assembly have four vanes.

There are two analogous piston assemblies 4 and 5 in the cavity of the housing. The assembly of pistons consists of cylindrical hub 6. Two or more vanes of rectangular cross-section are attached to the hub (see FIGS. 1, 3, 4). The vanes are arranged in the form of a symmetrical star. The piston assemblies are placed in the cylindrical cavity and can pivot around its axis using bearings arranged in the hubs.

Figure 5:
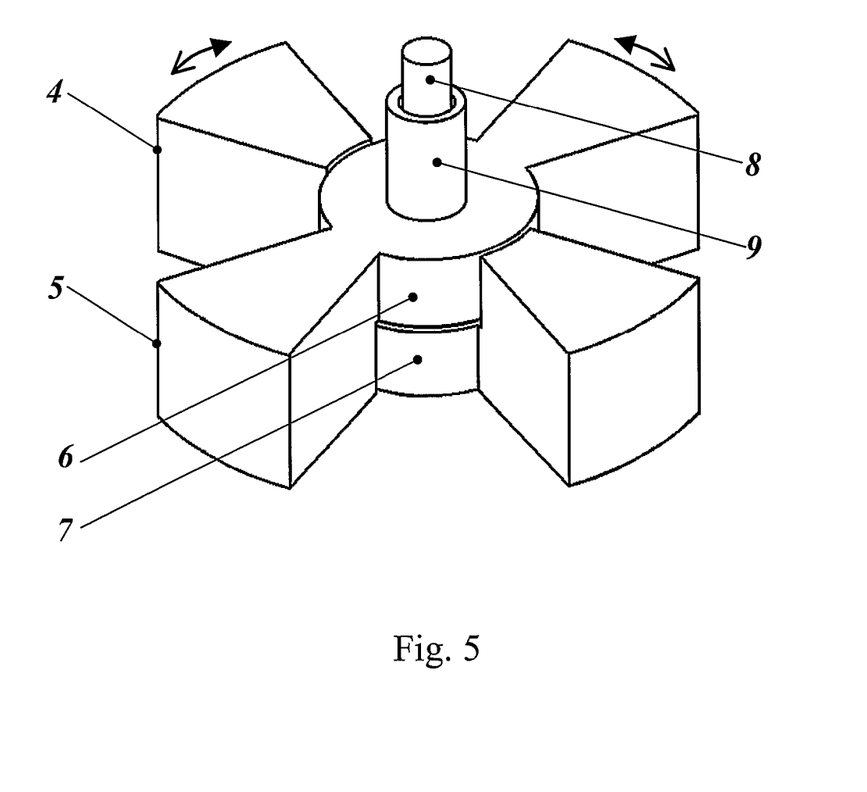
FIG. 5 shows the piston assembly with two vanes and with coaxial shafts for connecting external devices.

The piston assemblies can have coaxial shafts 8, 9 to connect external devices (see FIG. 5).

Figure 6:
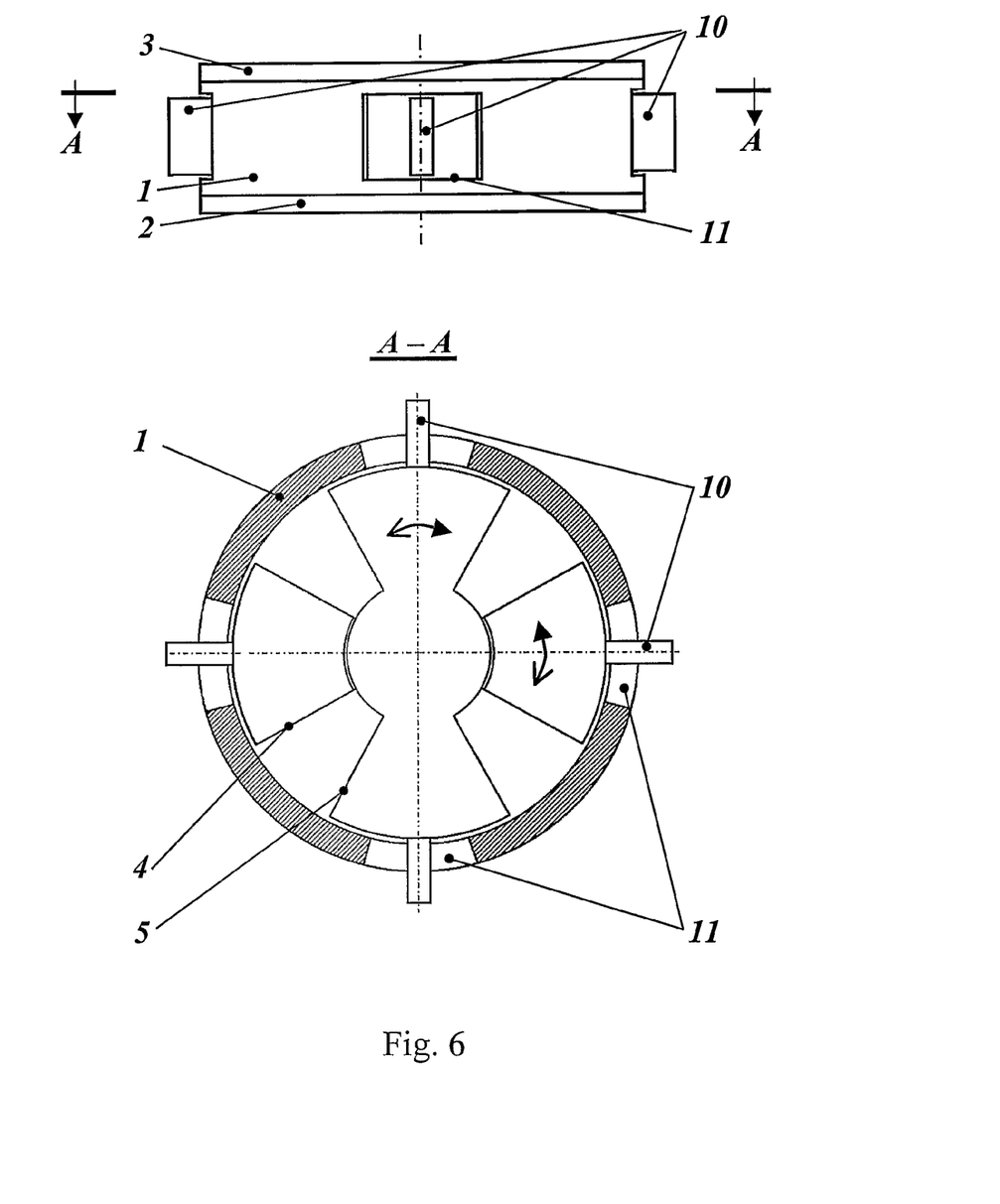
FIG. 6 shows the machine with enlarged ends of vanes having radial junctions for connecting external devices.

The piston assemblies can have radial junctions 10 arranged in the enlarged ends of vanes to connect external devices (see FIG. 6). These junctions move in the holes 11 of the housing, the holes being closed by the enlarged ends of vanes.

Figure 7:
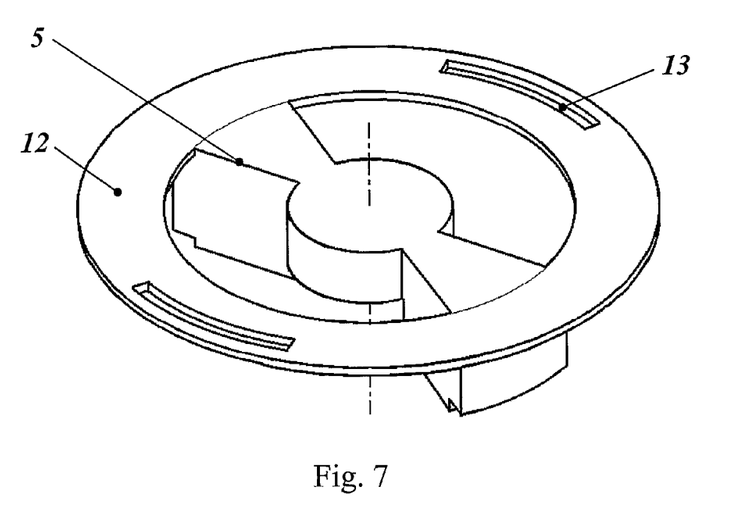
FIG. 7 shows the piston assembly with two vanes having a planar ring arranged at the ends of vanes connecting external devices.
Figure 8:
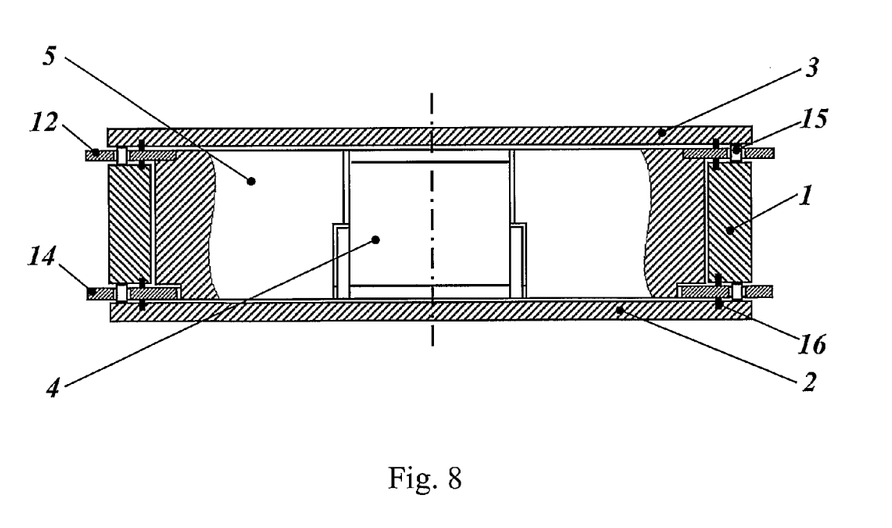
FIG. 8 shows a cross-section of the machine with the piston assembly of FIG. 7.

The planar rings 12, 14 could be arranged at the ends of vanes to connect external devices (see FIGS. 7, 8). These rings can move in the gaps between the cylindrical part of the housing and the covers. The planar rings have the holes 13 for junctions 15 of the separate housing parts. The sealing rings 16 could be arranged between the planar rings and the parts of housing.

Figure 9:
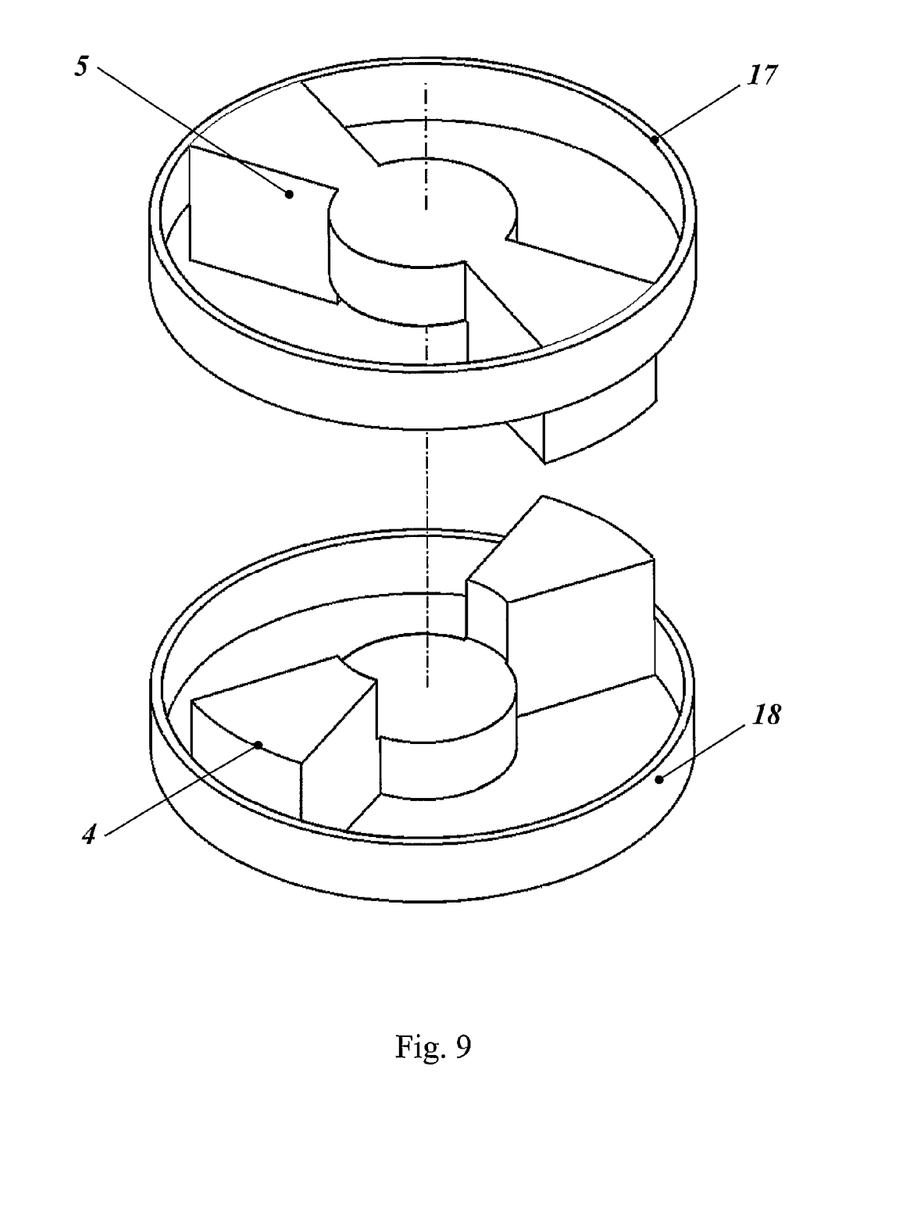
FIG. 9 shows an exploded view of a piston assembly having cylindrical rings arranged at the ends of the vanes for connecting of external devices.

The cylindrical rings 17, 18 could be arranged at the ends of vanes to connect external devices (see FIG. 9). The height of these rings is approximately equal to half of the height of the cylindrical cavity. In this case, the working cavity is formed by surfaces of the covers 2 and 3, hubs 6, and cylindrical rings 17 and 18.

Figure 10:
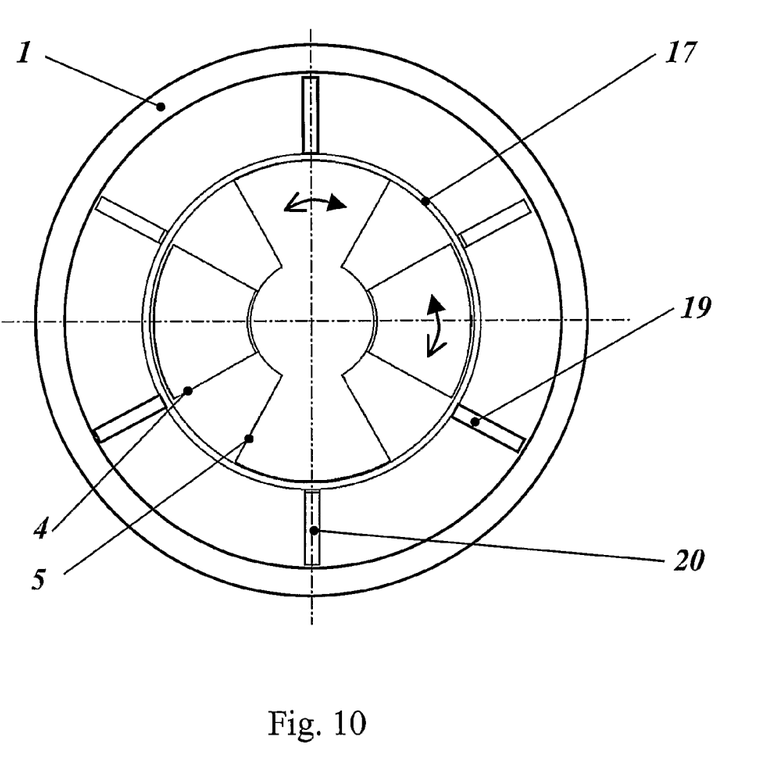
FIG. 10 shows the aggregate of two concentric heat machines.

If the planar or cylindrical rings of junction are used (see FIGS. 7, 8, 9), a few free swinging pistons heat machines could be arranged concentrically. In this case, the vanes of a second heat machine 19, 20 are attached to the junction rings. The set of two concentric heat machines is shown in FIG. 10.

Figure 2:
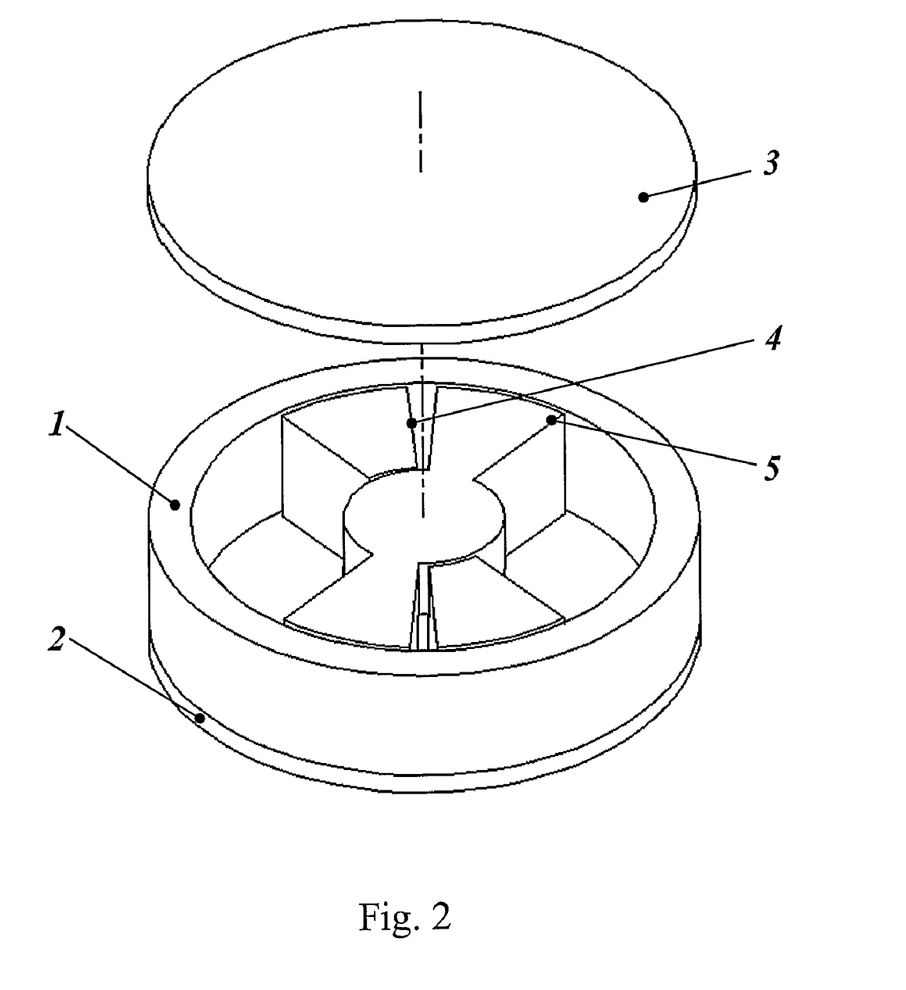
FIG. 2 shows the same machine as in FIG. 1, where two working chambers are decreased, and others are increased.

Operation of the free swinging piston heat machine occurs when the piston assemblies swing (oscillate) in opposite directions. In this way, variable working volumes are formed between the adjacent vanes of the different piston assemblies (see FIGS. 1, 2).

If the heat machine is used as a compressor or pump, the suction and pressure valves are arranged in the machine's housing, which connect an oscillating electrical motor that can directly drive such a compressor or pump. The rotors of the motor are connected with the piston assemblies through the corresponding junctions of external devices (see FIG. 11). In this case, the oscillating electrical motor can control the amplitude, frequency, spectrum, and center of oscillation of the piston assemblies.

If the heat machine is used as an internal or external combustion engine, and expander, the controlled valves (e.g. driven by an electrical drive of impulse movement) are arranged in the machine's housing, which connect the working volumes with the systems of inlet and exhaust. The injectors could also be arranged in the housing. The heat engine can directly drive an oscillating electrical generator with two rotors 22 and 23 connected by corresponding junctions, while the stator of the electrical generator could be undivided (see FIGS. 1 and 11). The electrical machine of the aggregate can be used for engine starting, as well as to control the oscillation amplitude of pistons (that is, the compression ratio), spectrum and center of oscillation.

Figure 11:
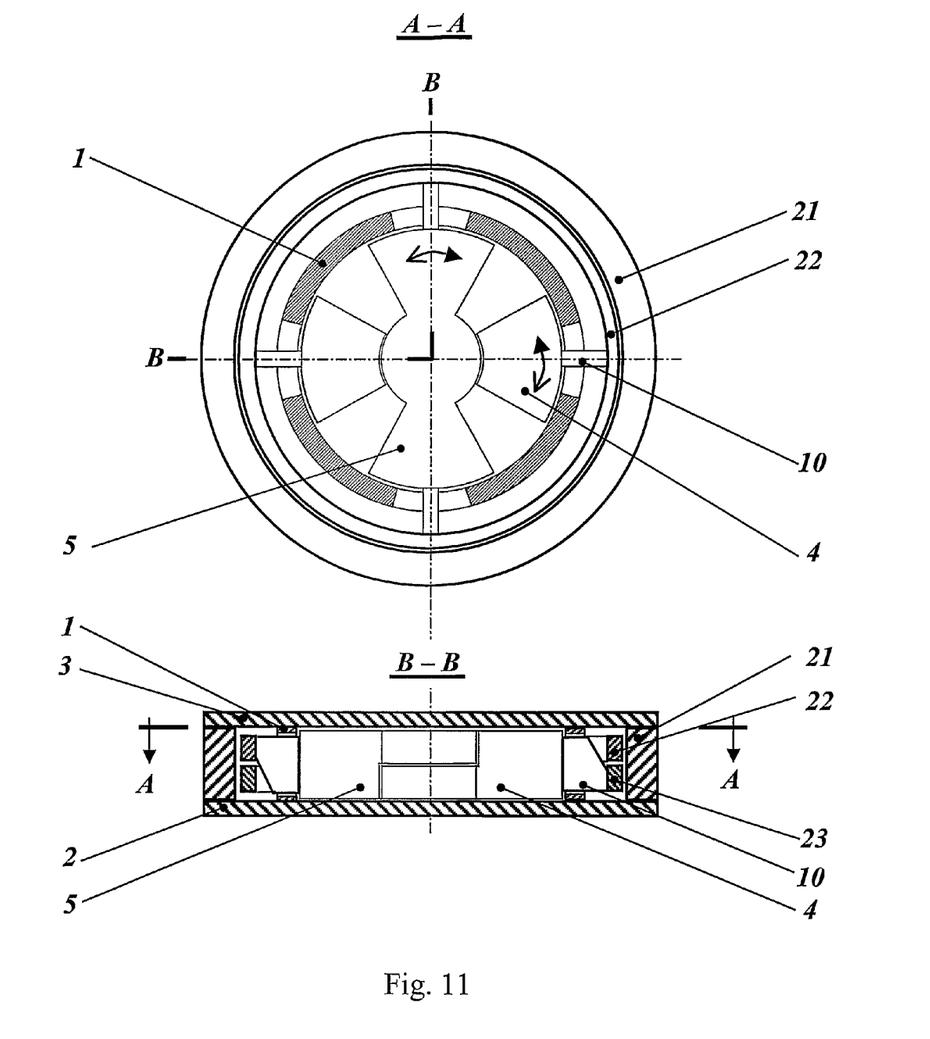
FIG. 11 shows the heat machine with a concentric oscillating rotating electrical machine.

Commonly, the conditional pressure developing by an electrical machine is less than pressure of a heat machine. Therefore, it is expedient to arrange the electrical machine outside of the heat machine, as it is shown in FIGS. 1 and 11. In this way, the compact structure of the aggregate can be realized with optimal utilization of components of the direct mechanical transmission.

Both the two-stroke operation and four-stroke operation of internal combustion engines can be realized in the free swinging piston heat machine, because, in any case, there are no less than 4 variable working chambers. It is expedient to use a heat machine with 8 working chambers (see FIG. 4) for four-stroke operation of the internal combustion engine. In this instance the four-stroke internal combustion engine becomes well symmetrized without additional vibration and load on the bearings.

If the heat machine operates as a two-stroke internal combustion engine, the inlet and exhaust ports can be arranged in the housing, and these ports can be opened and closed by the swinging pistons themselves.

When the concentric aggregate of several heat machines is used (FIG. 10), different variants of such an aggregate are possible. For example, one machine can operate as an internal combustion engine, and can be used as compressor (including a compressor of the scavenging of the internal combustion engine). A doubled heat machine can also be used as two-stage compressor.

Rotary bearings having small frictional losses are used as guides in the free swinging pistons heat machine. The vanes and rings of junctions are not guides, therefore they any operate without wear and frictional losses. The precise rotary bearings enable the realization of minimal clearance between the movable surfaces, and the machine can operate without additional elements of sealing and lubrication.

In all cases, the free swinging piston heat machine operates as a well balanced system of three bodies without vibration of the frame.

Obviously, numerous modifications and variations of the present invention are possible in light of the above teachings. It is therefore to be understood that within the scope of the appended claims, the invention may be practiced otherwise than as specifically described herein.

The invention claimed is:

1. A free swinging piston heat machine, operating together with at least one oscillating rotary electrical machine, comprising:

a housing with a cylindrical cavity;

two piston assemblies placed in the cylindrical cavity, which each consist of a cylindrical hub and attached vanes arranged in a form of a symmetrical star, the piston assemblies being configured to pivot around an axis of the cylindrical cavity; and two rotors of the at least one oscillating rotary electrical machine, the rotors being arranged concentrically or coaxially with the piston assemblies, each rotor being coupled with corresponding piston assemblies, such that the rotors oscillate together with the piston assemblies, wherein the piston assemblies, oscillating around the axis of the cylindrical cavity in opposite directions, create working chambers of the heat machine between adjacent vanes of different piston assemblies, and wherein oscillation of free pistons is controlled via the at least one oscillating rotary electrical machine.

2. The free swinging piston heat machine of according to claim 1, further comprising:

planar rings to connect external devices, the planar rings being attached to ends of the vanes and inserted in gaps between parts of the housing.

3. The free swinging piston heat machine according to claim 1, further comprising:

coupling rods to connect external devices, the coupling rods being arranged at enlarged ends of vanes and configured to move in holes of the housing, wherein the holes are maintained substantially closed by the enlarged ends of vanes.

4. The free swinging piston heat machine according to claim 1, wherein the piston assemblies each have three vanes.

5. The free swinging piston heat machine according to claim 1, further comprising:

at least one shaft disposed co-axially with the piston assemblies to connect an external device.

6. The free swinging piston heat machine according to claim 1, further comprising:

at least one cylindrical ring disposed at ends of the vanes to connect an external device.

\* \* \* \* \*